United States Patent
Baaijens et al.

(10) Patent No.: US 9,591,719 B2
(45) Date of Patent: Mar. 7, 2017

(54) LIGHTING SYSTEM AND A METHOD OF CONTROLLING A LIGHTING SYSTEM

(71) Applicant: KONINKLIJKE PHILIPS N.V., Eindhoven (NL)

(72) Inventors: Johannes Petrus Wilhelmus Baaijens, Eindhoven (NL); Willem Piet Van Hoof, Horst (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/889,573

(22) PCT Filed: Jan. 7, 2015

(86) PCT No.: PCT/EP2015/050122
§ 371 (c)(1),
(2) Date: Nov. 6, 2015

(87) PCT Pub. No.: WO2015/110279
PCT Pub. Date: Jul. 30, 2015

(65) Prior Publication Data
US 2016/0353550 A1 Dec. 1, 2016

(30) Foreign Application Priority Data

Jan. 21, 2014 (EP) .................. 14151896

(51) Int. Cl.
*H05B 37/02* (2006.01)
*H05B 39/04* (2006.01)
(Continued)

(52) U.S. Cl.
CPC .......... *H05B 37/0227* (2013.01); *F21K 9/64* (2016.08); *H05B 33/0851* (2013.01);
(Continued)

(58) Field of Classification Search
None
See application file for complete search history.

(56) References Cited

U.S. PATENT DOCUMENTS

| | | |
|---|---|---|
| 7,321,109 B2 | 1/2008 | Shur et al. |
| 7,652,236 B2 | 1/2010 | Cortenraad et al. |

(Continued)

FOREIGN PATENT DOCUMENTS

| | | |
|---|---|---|
| WO | 2009095833 A1 | 8/2009 |
| WO | 2011092625 A1 | 8/2011 |

(Continued)

*Primary Examiner* — Anh Tran

(57) ABSTRACT

A lighting system 100 and a method of controlling a lighting system are provided. The lighting system comprises a lighting arrangement 106 with a first light emitter 108, a second light emitter 114 and a driving circuitry 104 and comprises a controller 102 providing a control signal 103 to the driving circuitry. The first and second light emitters emit different colors or light $L_1$, $L_2$. The controller is configured to generate the control signal such that a required minimum amount of light is received at a relative position P with respect to the lighting arrangement and that the amount of power used by the lighting arrangement is minimized when the lighting arrangement emits light in accordance with the generated control signal. In the generation of the control signal efficiency ratios $R_1$, $R_2$ for the different light emitters are taken in to account.

16 Claims, 4 Drawing Sheets

(51) Int. Cl.
*H05B 41/36* (2006.01)
*H05B 33/08* (2006.01)

(52) U.S. Cl.
CPC ..... *H05B 33/0866* (2013.01); *H05B 37/0218* (2013.01); *H05B 37/0272* (2013.01); *F21Y 2115/10* (2016.08)

(56) References Cited

U.S. PATENT DOCUMENTS

| | | |
|---|---|---|
| 2008/0012722 A1 | 1/2008 | Moseley |
| 2008/0224635 A1* | 9/2008 | Hayes .................... H05B 37/02 315/297 |
| 2013/0043801 A1* | 2/2013 | Kuwu ................ H05B 33/0863 315/210 |
| 2013/0069561 A1 | 3/2013 | Melanson et al. |

FOREIGN PATENT DOCUMENTS

| | | |
|---|---|---|
| WO | 2011106661 A1 | 9/2011 |
| WO | 2012119755 A2 | 9/2012 |
| WO | 2013055650 A1 | 4/2013 |

\* cited by examiner

LIGHTING SYSTEM AND A METHOD OF CONTROLLING A LIGHTING SYSTEM

CROSS-REFERENCE TO PRIOR APPLICATIONS

This application is the U.S. National Phase application under 35 U.S.C. §371 of International Application No. PCT/EP2015/050122, filed on Jan. 7, 2015, which claims the benefit of European Patent Application No. EP 14151896.9, filed on Jan. 21, 2014. These applications are hereby incorporated by reference herein.

FIELD OF THE INVENTION

The invention relates to lighting systems which comprises at least two light emitters that emit different colors of light.

The invention further relates to a method of controlling a lighting system.

BACKGROUND OF THE INVENTION

Today many lamps and lighting systems comprise several light emitters that emit light at different colors and such lamps and lighting systems may be controlled to emit the different colors of light in any possible combination such that about every color of light or about every spectral distribution of light may be emitted. Such lamps or lighting systems are often used to illuminate shelves in a shop or to illuminate a specific object. The lamps of the lighting system may be controlled such that presented products on the shelves or the object appears more appealing to humans. For example, when tomatoes in a supermarket are illuminated with light which comprise a relatively large amount of red light, buyers experience them as an appealing tomatoes.

Published patent application WO2011/092625A1 discloses a method for controlling a color adjustable light source to illuminate an object. In response to receiving a color of the illuminated object, the light source is controlled such that it emits white light in combination with a saturated component corresponding to the color of the illuminated object.

When the system of the published patent application is used, it still uses a relatively large amount of energy. There is a need to make the above lighting systems and lamps more efficient.

SUMMARY OF THE INVENTION

It is an object of the invention to provide a more efficient lighting system with a controllable lighting arrangement and method of controlling such a lighting system.

As defined in the claims, an aspect of the invention provides a lighting system. Another aspect of the invention provides a method of controlling a lighting system. Advantageous embodiments are defined in the dependent claims.

A lighting system in accordance with an aspect of the invention comprises a lighting arrangement and a controller. The lighting arrangement is configured to emit mixed light which is a combination of light emitted by a first light emitter and by a second light emitter. The lighting arrangement also comprises a driving circuitry and is configured to receive a control signal indicating a first required light emission by the first light emitter and a second required light emission by the second light emitter. The first light emitter emits first light of a first color distribution and the second light emitter emits second light of a second color distribution which is different from the first color distribution. The driving circuitry is configured to drive the first light emitter at a first power level in response to the received control signal and to drive the second light emitter at a second power level in response to the received control signal. The controller generates the control signal and is configured to obtain a required illumination level, a first efficiency ratio and a second efficiency ratio and to determine the first required light emission and the second required light emission. The first efficiency ratio is a ratio between an amount of power provided to the first light emitter and an amount of the first light received at a relative position with respect to the lighting arrangement. The second efficiency ratio being a ratio between an amount of power provided to the second light emitter and an amount of the second light received at the relative position. The determining of the first required light emission and the second required light emission is performed such that, when the said light emitters emit light in accordance with said required light emissions, an amount of the mixed light received at the relative position is at least the required illumination level while an amount of power consumed by the lighting arrangement is minimized. The determining of the first required light emission and the second required light emission takes into account the first efficiency ratio and the second efficiency ratio.

The above lighting system obtains efficiency information which relates to the amount of power consumed by different light emitters and how efficient the amount of light emitted is directly or indirectly transmitted towards the relative location. This efficiency information is used to control the different light emitters such that a minimum lighting condition is met and such that the amount of consumed power is minimized. Thus, the lighting system operates more efficiently and costs are saved.

It was the insight of the inventors that when, such as for example in the cited patent application, additional components of (saturated) light are added to a light emission to enhance a specific color of illuminated objects, the total amount of emitted light may be reduced, and, thus, energy may be saved. A further insight of the inventors is that when the required amount of light is defined for the relative position and the efficiency ratios between received light at the relative position and amounts of power provided to the light emitters are known, that the light emitters may be controlled such that, in particular for the relative position, the most energy efficient illumination is obtained. The relative position is not by definition a position to which the lighting arrangement directly emits its light. The amount of light at the relative position may also relate to reflected light by, for example, the illuminated area/the illuminated object.

For example, when the first light emitter emits relatively warm white light and the second light emitter emits relatively cold white light and a more yellow/orange area or object is illuminated, the warm white light is better reflected and, thus, the first efficiency relation is relatively high in this situation. The above discussed lighting system takes such different conditions into account to obtain an energy efficient illumination of such a more yellow/orange area or object by controlling the warm white light emitter to emit more light than the cold white light emitter.

It must be noted that the above lighting system is not limited to lighting arrangements which only comprise two light emitters. The lighting arrangement may comprise more light emitters that emit more colors of light, and efficiency ratios for all these different light emitters are taken into account. For example, the lighting arrangement comprises light emitters that emit Red, Blue, Green and Amber light, or the lighting arrangement comprises light emitters that emit Red, Blue, Green and white light. The light emitter of the lighting arrangement may also be arranged in groups of light emitters. Within a group the light emitters emit the same color of light and between different groups different colors of light are emitted. The efficiency ratios relate in that case to a ratio between the amount of power used to drive a specific group of light emitters and the amount of emitted light that is received at the relative position. The light emitters may comprise a solid state light emitter that has a die that emits a specific color of light, and the light emitter may comprise such a solid state light emitter that is provided with a luminescent material that converts at least a part of the light emitter by the solid state light emitted towards light of another color. Because the efficiency ratios relate to the complete transformation of electrical energy towards the reception of light at the relative position, efficiency drops which might relate to, for example, the use of luminescent material are also taken into account.

The amount of light may be expressed in lumen. This is in particular advantageous because lumen relate to the sensitivity of the human eye to specific wavelengths of light, and as such, the efficiency ratios take also into account how intense a specific power of light of a specific wavelength is perceived by humans.

Optionally, the lighting system may comprise a sensor for sensing an amount of light impinging on the sensor and the sensor may be positioned at the relative position. The sensor is coupled to the controller. The sensor may be a relatively cheap luminance meter which is capable of measuring how much lumen of light is received at the specific location or may be, in specific embodiments, a spectrometer. The information obtained by the spectrometer can also be translated to intensity information expressed in lumen. In practical embodiments, the sensor only measures the light that is received from a specific direction (or a plurality of directions).

The efficiency ratios may be preprogrammed in a register or in a memory of the controller, but in an optional embodiment, the lighting system is configured to obtain these values by means of measurements and calculations. In such an optional embodiment, the controller is further configured to obtain knowledge about the first efficiency ratio and the second efficiency ratio by: a) providing a first control signal to the lighting arrangement indicating that only the first light emitter has to be driven with a specific amount of power, b) obtaining a measurement from the sensor arranged at the specific relative position while only the first light emitter emits first light in accordance with the first control signal, c) calculating the first efficiency ratio, d) providing a second control signal to the lighting arrangement indicating that only the second light emitter has to be driven with a specific amount of power, e) obtaining a measurement from the sensor while only the second light emitter emits second light in accordance with the second control signal, and f) calculating the second efficiency ratio.

Optionally, the controller determines the first efficiency ratio and the second efficiency ratio at least at one of the moments of: when the lighting system is installed, when the lighting system is switched on and when a calibration command is received by the controller.

Optionally, the first efficiency ratio is a ratio between an amount of power provided to the first light emitter and an amount of the first light reflected into the direction of the relative position from an area illuminated by the lighting arrangement. The second efficiency ratio being a ratio between an amount of power provided to the second light emitter and an amount of the second light reflected into the direction of the relative position from the area illuminated by the lighting arrangement. The sensor is adapted to measure reflected light for obtaining an amount light reflected into the direction of the relative position from the area illuminated by the lighting arrangement.

Optionally, a user interface arrangement being coupled to the controller and being configured to receive from a user the required illumination level. Such a user interface arrangement allows the user to control the amount of light that is emitted thereby adapting the illumination level to his personal preferences. The user interface arrangement may be provided as an integral part of the controller, but may also be provided as a separate device that is coupled to the controller. The user interface arrangement may comprise a display and means to receive input from a user such as, for example, a keyboard or a touch sensitive screen.

Optionally, the controller is further configured to: i) obtain one or more additional requirement(s) with respect to characteristics of the mixed light received at the relative position, ii) take into account the additional requirement(s), the required illumination level and the objective of the minimum power consumption by the lighting arrangement while determining the first required light emission and the second required light emission. Thus, the optimization for power consumption may be further influenced by other requirements or boundary conditions such that the illumination fulfills expectations of the users. Often, especially when there are more than three light emitters that emit different colors of light, there are different options for controlling the light emitters to obtain the required minimum illumination level and to fulfill the additional requirements. In that situation, the controller may select from different options the most energy efficient option. Examples of the additional requirement(s) are a minimum Color Rending Index of the light received at the relative location, a color point of the light received at the relative location, a color temperature of the light received at the relative location and a required additional saturated color component in the emitted mixed light.

Optionally, the controller and the lighting arrangement are provided in separate devices. The lighting arrangement may be, for example, a lamp in which the driving circuitry is integrated. The controller may, for example, be provided in a mobile phone, or a computer (which might be portable). The controller may, in this optional embodiment, be connected by a cable with the lighting arrangement, or may be coupled with a network to the lighting arrangement, such that the control signal can be transmitted via either the cable of the network to the lighting arrangement. When the lighting system also comprises a sensor and/or a user interface arrangement, the information that is collected/obtained by the sensor and user interface arrangement may be transmitted via the network to the controller. The controller is, for example, a remotely located server which has a huge computational power to calculate the most efficient settings for the lighting arrangement.

According to another aspect of the invention, a method of controlling a lighting system is provided. The lighting system comprises a lighting arrangement for emitting mixed light. The lighting arrangement comprises a first light emitter, a second light emitter and a driving circuitry. The first light emitter is configured to emit first light of a first color distribution and the second light emitter is configured to emit second light of a second color distribution which is different from the second color distribution. The method comprises the stage of: a) obtaining a required illumination level; b) obtaining a first efficiency ratio and a second efficiency ratio, the first efficiency ratio is a ratio between an amount of power provided to the first light emitter and an amount of the first light received at a relative position with respect to the lighting arrangement, the second efficiency ratio is a ratio between an amount of power provided to the second light emitter and an amount of the second light received at the relative position; c) generating a control signal, the control signal comprising a first required light emission by the first light emitter and a second required light emission by the second light emitter, the control signal is generated by determining the first required light emission and the second required light emission such that, when said light emitters emit light according to said required light emissions, an amount of the mixed light received at the relative position is at least the required illumination level while an amount of power consumed by the lighting arrangement is minimized; d) providing the control signal to the driving circuitry; and e) driving the first light emitter at a first power level in response to the received control signal and driving the second light emitter at a second power level in response to the received control signal.

The method according to the another aspect of the invention provides the same benefits as the lighting system according to the first aspect of the invention and has similar embodiments with similar effects as the corresponding embodiments of the system.

These and other aspects of the invention are apparent from and will be elucidated with reference to the embodiments described hereinafter.

It will be appreciated by those skilled in the art that two or more of the above-mentioned options, implementations, and/or aspects of the invention may be combined in any way deemed useful.

Modifications and variations of the lighting system and/or the method which correspond to the described modifications and variations of the lighting system, can be carried out by a person skilled in the art on the basis of the present description.

Figure 1:
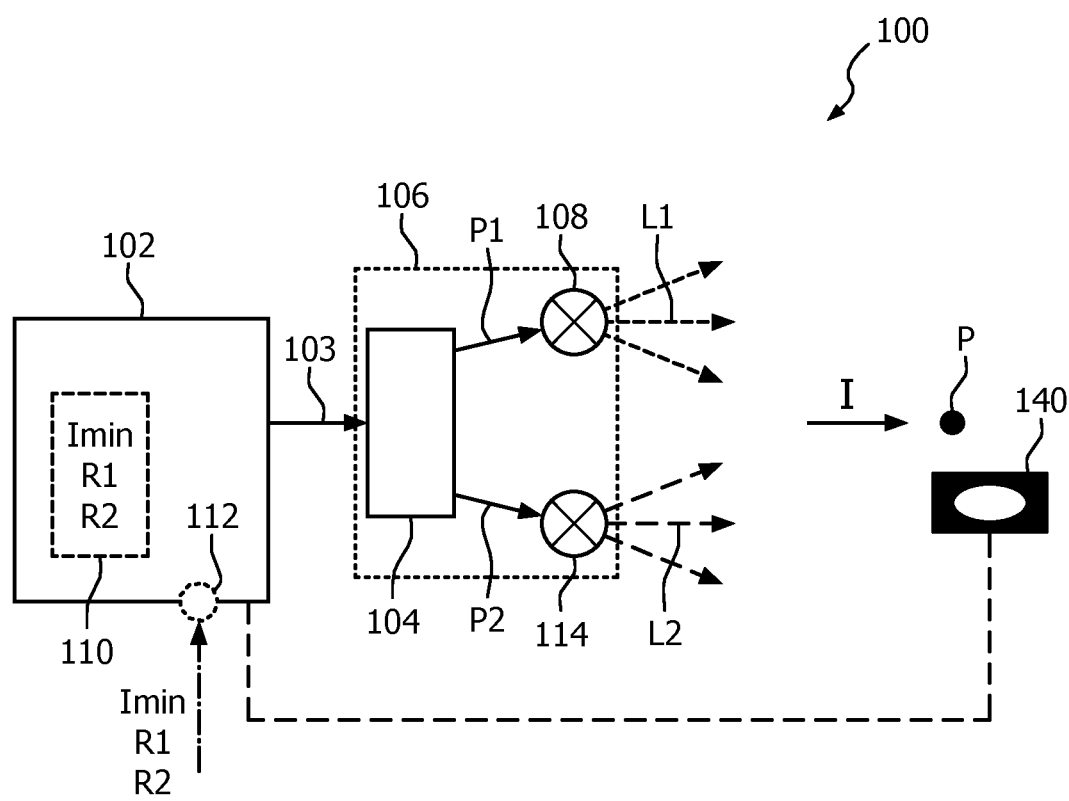
FIG. 1 schematically shows an embodiment of a lighting system.

It should be noted that items denoted by the same reference numerals in different Figures have the same structural features and the same functions, or are the same signals. Where the function and/or structure of such an item have been explained, there is no necessity for repeated explanation thereof in the detailed description.

The Figures are purely diagrammatic and not drawn to scale. Particularly for clarity, some dimensions are exaggerated strongly.

DETAILED DESCRIPTION

A first embodiment is shown in FIG. 1. FIG. 1 schematically shows an embodiment of a lighting system 100 which comprises a controller 102 and a lighting arrangement 106. The lighting arrangement 106 comprises a driving circuitry 104, a first light emitter 108 and a second light emitter 114. The driving circuitry 104 is coupled to the controller 102 and receives from the controller 102 a control signal 103. The driving circuitry 104 provides power $P_1$, $P_2$ to the first light emitter 108 and the second light emitter 114, respectively, to drive the light emitters 108, 114. The amount of provided power $P_1$, $P_2$ is determined by information being present in the control signal 103.

The first light emitter 108 emits light $L_1$ of a first color distribution and the second light emitter 114 emits light $L_2$ of a second color distribution. The second color distribution is different from the first color distribution and at least the human naked eye experiences a color difference between the first light $L_1$ and the second light $L_2$. The control signal 103 comprises a first required light emission sub-signal and a second required light emission sub-signal indicating the required light emission of the first light emitter 108 and the second light emitter 114, respectively. The first light emitter 108 and the second light emitter 114 may be any type of light emitter, and in an example, the light emitters 108, 114 are solid state light emitter such as, for example, a Light Emitting Diode. The light emitter 108, 114 may directly emit the first color distribution and the second color distribution, respectively, but may also comprise luminescent material for converting at least a portion of the light emitted by one of the light emitters towards another color of light such that the obtained light emission is a combination of light emitted by the light emitter itself and light emitted by the luminescent material. For example, the first light emitter 108 and the second light emitter 114 comprise a Light Emitting Diode die which emits blue light and both light emitters 108, 114 are provided with luminescent material which converts blue light towards yellow light. In the example, the amount of luminescent material provided on the second light emitter 114 may be larger. This may result in a first color distribution of white light with a relatively high color temperature (cool white light) and in a second color distribution of white light with a relatively low color temperature (warm white light). It is to be noted that, in other embodiment, the light emitters and the used luminescent material may have different characteristics resulting in other color distributions.

The lighting arrangement 106 emits mixed light which is a combination of the first light $L_1$ and the second light $L_2$. At least a portion of the mixed light is also received at a relative position P. The relative position P is a position relative to the lighting arrangement. The lighting arrangement 106 may emit light directly towards the relative position P, but the relative position P may also have such a position that the emitted mixed light is (partly) reflected towards the relative position P. At the relative position a specific amount of light I is received from the lighting arrangement 106.

The controller 102 is configured to obtain a required minimum illumination level $I_{min}$, a first efficiency ratio $R_1$ and a second efficiency ratio $R_2$. The controller 102 may obtain these parameters from an internal memory 110, or may receive it at an input port 112 of the controller 102. Other embodiments of obtaining such information are discussed later in this document. The minimum illumination level $I_{min}$ indicates what the required amount of (mixed) light received at the relative position P has to be. The first efficiency ratio $R_1$ is a ratio between an amount of power $P_1$ provided to the first light emitter 108 and an amount of first light $L_1$ received at the relative position P when the first light emitter 108 receives the amount of power $P_1$. The second efficiency ratio $R_2$ is a ratio between an amount of power $P_2$ provided to the second light emitter 114 and an amount of second light $L_2$ received at the relative position P when the second light emitter 114 receives the amount of power $P_2$. Thus, the efficiency ratios $R_1$, $R_2$ express how efficient light is generated in the light emitter 108, 114, respectively, and how efficient (e.g. which portion of) this generated light is transmitted to the relative position P.

The controller 102 is further configured to generate the control signal 103, and, thus, to determine the first required light emission (which expresses with how much power the first light emitter 108 must be driven), and to determine the second required light emission (which expresses with how much power the second light emitter 114 must be driven). The generation of the control signal 103 is done such that the received amount of light I at the relative position P is equal to or larger than the minimum illumination level $I_{min}$ and such that the total amount of power $P_1+P_2$ provided by the driving circuitry 104 to the light emitters 108, 114 is as low as possible. In other words, the controller 102 is configured to solve an optimization problem which has as an objective function min $(P_1+P_2)$ and which has as a boundary condition: $I>=I_{min}$. The problem is solved by using the information of the efficiency ratios $R_1$, $R_2$. In other embodiments, the controller 102 is not directly an optimization solver, but comprises, for example, pre-programmed (or earlier generated) tables that are based on the efficiency ratios $R_1$, $R_2$ and which expresses the relation between the amount of light I received at the relative position R and the amount of power $P_1+P_2$ provided to the light emitters. The controller 102 may be configured to find in the table a specific driving condition for the light emitters 108, 114 such that the amount of consumed power consumed by the light emitters 108, 114 is minimized. The controller 102 may also have a preprogrammed function which expresses the relation between the amount of light I received at the relative position P and the amount of power $P_1+P_2$ provided to the light emitters. This function may be used by the controller 102 to find in an empirical or analytic/mathematical manner an optimal driving condition for the light emitters 108, 114.

In an optional embodiment, the above discussed amount of light I received at the relative position P and the minimum illumination level $I_{min}$ are expressed in lumen, and also the efficiency ratios are based on an amount of light expressed in lumen.

Optionally, the lighting system 100 also comprises a sensor 140 which is capable of sensing an intensity of light, for example, the received amount of light I at the relative position P. The sensor 140 may be coupled to the controller 102. When the sensor 140 is arranged at the relative position P, the sensor may be used by the controller 102 to check whether the received amount of light I at the relative position P is indeed equal to or higher than the minimum illumination level $I_{min}$ and if that is not the case, the controller 102 may be configured to adapt the sub-signals of the control signal 103 such that the amount of light I received at the relative position P becomes equal to or larger than the minimum illumination level $I_{min}$, while at the same moment in time the sub-signals are generated such that the amount of power $P_1+P_2$ consumed by the light emitters 108, 114 is minimized.

Another advantageous use of the sensor 140 is that it may be used to obtain the efficiency ratios $R_1$, $R_2$. For example, when the lighting system 100 is installed at a particular location, a calibration procedure may be executed to obtain the efficiency ratios $R_1$ and $R_2$ that relate to the specific location where the lighting system 100 is installed and which relates to the area and/or objects that are illuminated by the lighting system 100. Such a calibration may also be performed each moment in time that the lighting system 100 is switched on, or may be executed when a command (for example, from a user) is received by the controller 102 to perform the calibration procedure. The controller 102 controls such a calibration procedure and is configured to: i) provide a first control signal 103' to the lighting arrangement 106 indicating that only the first light emitter 108 has to be driven with a specific amount of power $P_1'$, ii) obtain an amount I' of light measurement from the sensor 140 arranged at the relative position P while only the first light emitter 108 emits first light $L_1$ in accordance with the first control signal 103', iii) calculate the first efficiency ratio $R_1=P_1'/I'$, iv) provide a second control signal 103" to the lighting arrangement 106 indicating that only the second light emitter 114 has to be driven with a specific amount of power $P_2'$, v) obtain an amount I" of light measurement from the sensor 140 while only the second light emitter 114 emits second light $L_2$ in accordance with the second control signal 103", vi) calculate the second efficiency ratio $R_2=P_2'/I"$. The controller 102 may be configured to store the obtained efficiency ratios $R_1$, $R_2$ in, for example, its internal memory 110. In other example, the obtained efficiency ratios $R_1$, $R_2$ are used by the controller 102 to generate the previously discussed embodiments of tables or functions expressing the relation between the amount of light I received at the relative position R and the amount of power $P_1+P_2$ provided to the light emitters 108, 114.

In the above discussion of the lighting system 100 of FIG. 1 only one boundary condition is provided to, or obtained by, the controller 102. This boundary condition is the minimum illumination level $I_{min}$ at the relative position P. The minimum illumination level $I_{min}$ is indeed an important boundary condition in most lighting systems 100, but in practical embodiments, other boundary conditions are defined to be taken into account as well by the controller 102. For example, when the first light emitter 108 emits cool white light (with a relatively high color temperature) and the second light emitter 114 emits warm white light (with a relatively low color temperature), by mixing the first light $L_1$ and the second light $L_2$ in specific relative amounts, other color temperatures in between the relatively high and relatively low color temperature can be obtained. Thus, a user may define, for example, a required color temperature $T_{req}$ of the light received at the relative position and this required color temperature may be stored in the memory 110 of the controller 102, or received at an input port 112 of the controller 102. When the controller 102 generates the control signal 103, it has to take the required color temperature also into account such that at the relative position P light is received which has a minimum illumination level $I_{min}$, what has a color temperature that is about equal to the required color temperature $T_{req}$, while at the same moment in time the amount of power $P_1+P_2$ consumed by the light emitters 108, 114 is minimized. It is known in the field of lighting how to determine in which relative quantities the first light $L_1$ and the second light$_2$ must be mixed to obtain such a required color temperature and this knowledge may be preprogrammed in the controller 102 in, for example, tables, but may also be expressed as a function which may be used when solving an optimization problem in an mathematical manner. Other boundary conditions may be defined as well, such as a required color rending index $CRI_{req}$ of the light received at the relative position P, or a required color point of the light received at the relative position P.

Figure 2:
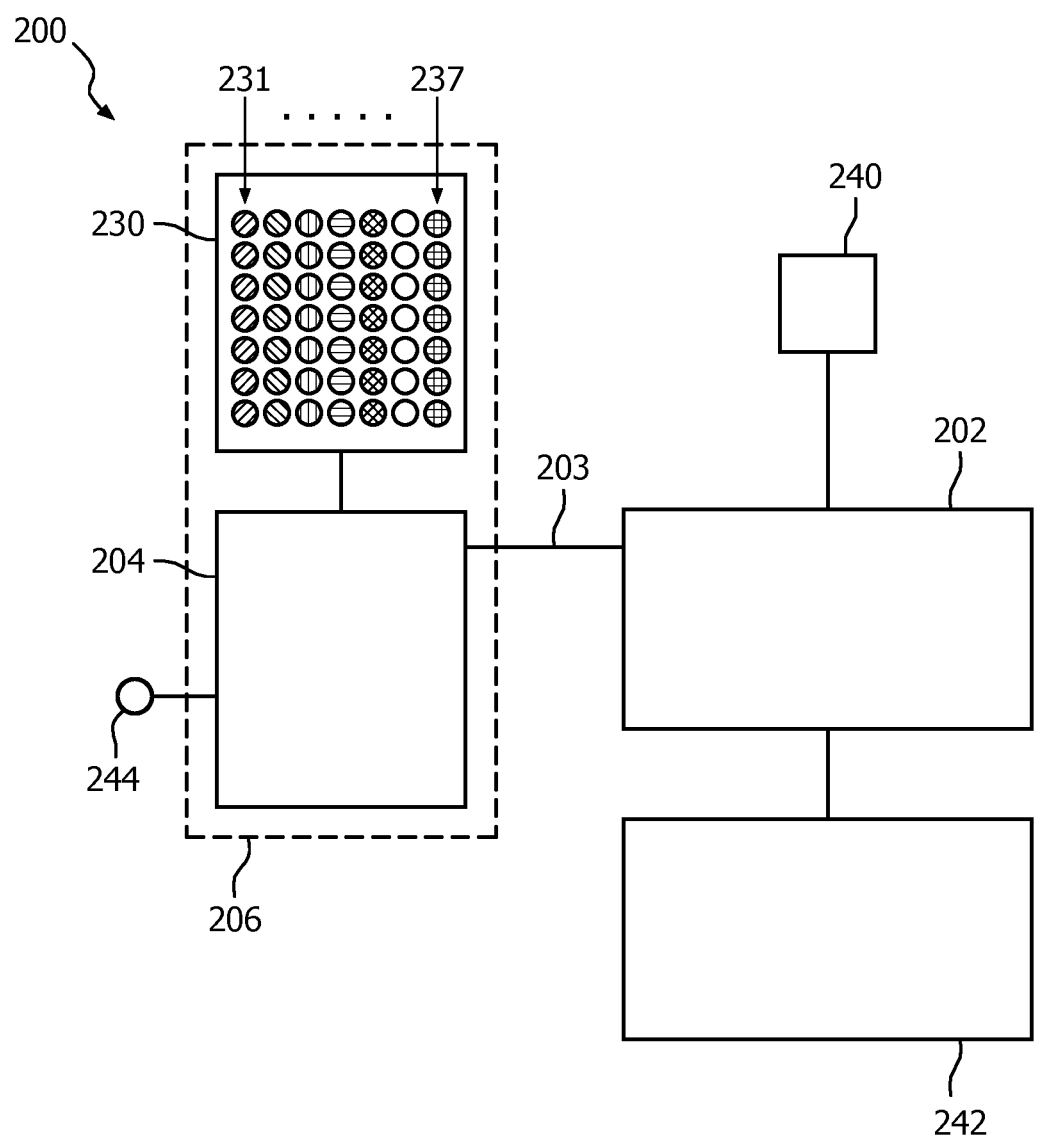
FIG. 2 schematically shows a further embodiment of a lighting system.

FIG. 2 schematically shows a further embodiment of a lighting system 200. The lighting system 200 is similar to the lighting system 100 as discussed before and has similar embodiments with similar effects as the lighting system 100. The lighting system 200 comprises a lighting arrangement 206, a controller 202, a user interface device 242 and a luminance sensor 240. The lighting arrangement 206 comprises a driving circuitry 204 which receives power from a power source 244, which receives a control signal 203 from the controller 202 and which provides driving signals to a light source 230. The lighting arrangement 206 also comprises the light source 230 which comprises a plurality of light emitters arranged in seven groups 231 . . . 237 of light emitters. Each light emitter in a single group 231 . . . 237 of light emitters emits the same color of light, which means, about the same color distribution. The color distributions emitted by the different groups 231 . . . 237 of light emitters are not equal to each other and, thus, each group 231 . . . 237 of light emitters emits another color of light. For example, the different colors of light emitted by the different groups 231 . . . 237 are: deep red, red, amber, yellow, green, cyan, blue. The controller 202 has obtained (either by a calibration procedure as discussed before, or from a memory or received at an input port) efficiency ratios for every group 231 . . . 237 of light emitters. As discussed before, the efficiency ratios are a ratio between an amount of power provided to a specific group 231 . . . 237 of light emitters and the amount of light received at a relative position (which position is not explicitly shown in FIG. 2, but may be the position of sensor 240). When such a relatively large number of groups 231 . . . 237 of light emitters is used to emit different colors of light, there is, in most cases, an infinity number of possible combination for combining the different colors of light in specific relative amounts to obtain a specific color point, to obtain a specific light intensity and/or to obtain a specific Color Rendering Index (and/or to fulfill other boundary conditions). Such an embodiment therefore provides a good possibility to choose or select one of the large number of possible combinations (or calculate this specific combination) such that the amount of consumed energy by the groups 231 . . . 237 of light emitters is minimized. As discussed previously, the controller 202 may comprises tables or functions which express the relations between the amount of power provided to the different groups 231 . . . 237 and characteristics of the obtained light received at the relative position. Also, as discussed previously, the controller 202 may comprises several functions which express these relations and these functions may be used to define a mathematical optimization problem that is subsequently solved by the controller 202 to obtain the different required light emissions by the different groups 231 . . . 237 of light emitters such that all boundary conditions are fulfilled.

It is to be noted that in the example of FIG. 2 the light source 230 comprises 7 groups 231 . . . 237 of light emitters and that each group 231 . . . 237 of light emitters comprises 7 light emitters. However, embodiments are not limited to these specific numbers. The light source 230 may comprises a different number of groups 231 . . . 237 of light emitters and each group 231 . . . 237 may comprise a different number of light emitters. It is also not required that each group 231 . . . 237 comprises the same number of light emitters. For example, the groups which emit pure Red, pure Green and pure Blue light may comprise a relatively large number of light emitters, and other groups that emit a secondary color of light, such as amber, yellow, orange, or cyan may comprise a lower number of light emitters. In an embodiment, the light source comprise four groups of light emitter which emit, for example, Red, Green, Blue and Amber light, or which emit, for example, Red, Green, Blue and White light. Of course, when the number of groups differ from the presented embodiment, the driving circuitry is configured for, at least, driving this different number of groups and the control signal comprises a number of sub-signals that it at least equal to the number of groups. Of course, when the number of groups is different, the controller is also able to handle such a different number of groups.

As discussed previously, the controller 202 may be used to calibrate the lighting system 200 for use at a specific location and specific arrangement. The controller may control each one of the groups 231 . . . 237 to illuminate at different moment of time some light (of which the amount of power provided to the group is known) and the sensor 240 may be used to measure at such moments in time the amount of light received at the relative position. The known amount of power provided to the groups and the measured amount of light received at the relative position is input for calculating the efficiency ratios which are subsequently used to determine which amount of light each one of the groups has to emit to fulfill the boundary conditions and to minimize the amount of power used by the light source 230.

In FIG. 2 the lighting system 200 also comprises an optional user interface device 242 which might be a sub-portion of the controller 202 or which may be a separate device. The user interface device 242 provides a possibility to a user to provide boundary conditions for the light received at the relative position, such as there are: the minimum illumination level, the required color point, the required Color Rendering Index of the light received at the relative position and/or a required additional saturated color component in the emitted mixed light (which might be used to enhance a color of objects having a color similar to the additional saturated color). The user interface device 242 comprises, for example, a display and an arrangement for receiving input from a user (e.g. a touch screen). The input that is received from the user is provided to the controller 202 which uses the input as the boundary conditions to determine how the different groups 231 . . . 237 of light emitters must be driven to receive at the relative position a specific lighting that fulfill the boundary conditions as inputted by the user and which minimized energy usage. It is noted that the user interface device 242 may be implemented by, for example, a mobile phone or a tablet computer. In a further embodiment, such a mobile phone or tablet computer may also comprise the controller 202, or a yet another embodiment, also the luminance sensor 240. A camera sensor of a mobile phone or tablet computer may also be used as a luminance sensor 240 because the received amount of light can be derived from the information obtained by the camera sensor. A possible use-case of the lighting system 200 is that the lighting arrangement 206 is, for example, provided in a luminaire and that a mobile phone with the sensor 240, the controller 202 and the user interface device 242 is used to obtain required power driving levels for the different groups 231 . . . 237 of light emitters and that these required power driving levels are wirelessly transmitted to the lighting arrangement 206 which stores these required power driving levels as settings. After the determination of the required power driving levels the lighting arrangement emits light according to the settings and the mobile phone can be used for other tasks (which may also comprise the determination of required power driving levels for a further lighting arrangement similar to the lighting arrangement 206). In yet a further embodiment, the controller 202 may be provided at a remote location which is assessable via a network. For example, when a mobile device without a lot of computational power, but with a user interface and a sensor, is used to measure light and receive additional boundary conditions, the information obtained by the sensor and the user interface may be transmitted to a remote server which computes the best setting for the lighting arrangement, and the computed settings are returned to either the mobile device which provides them to the lighting arrangement or to the lighting arrangement directly when the lighting arrangement is coupled to the same network as the remote server.

Figure 3:
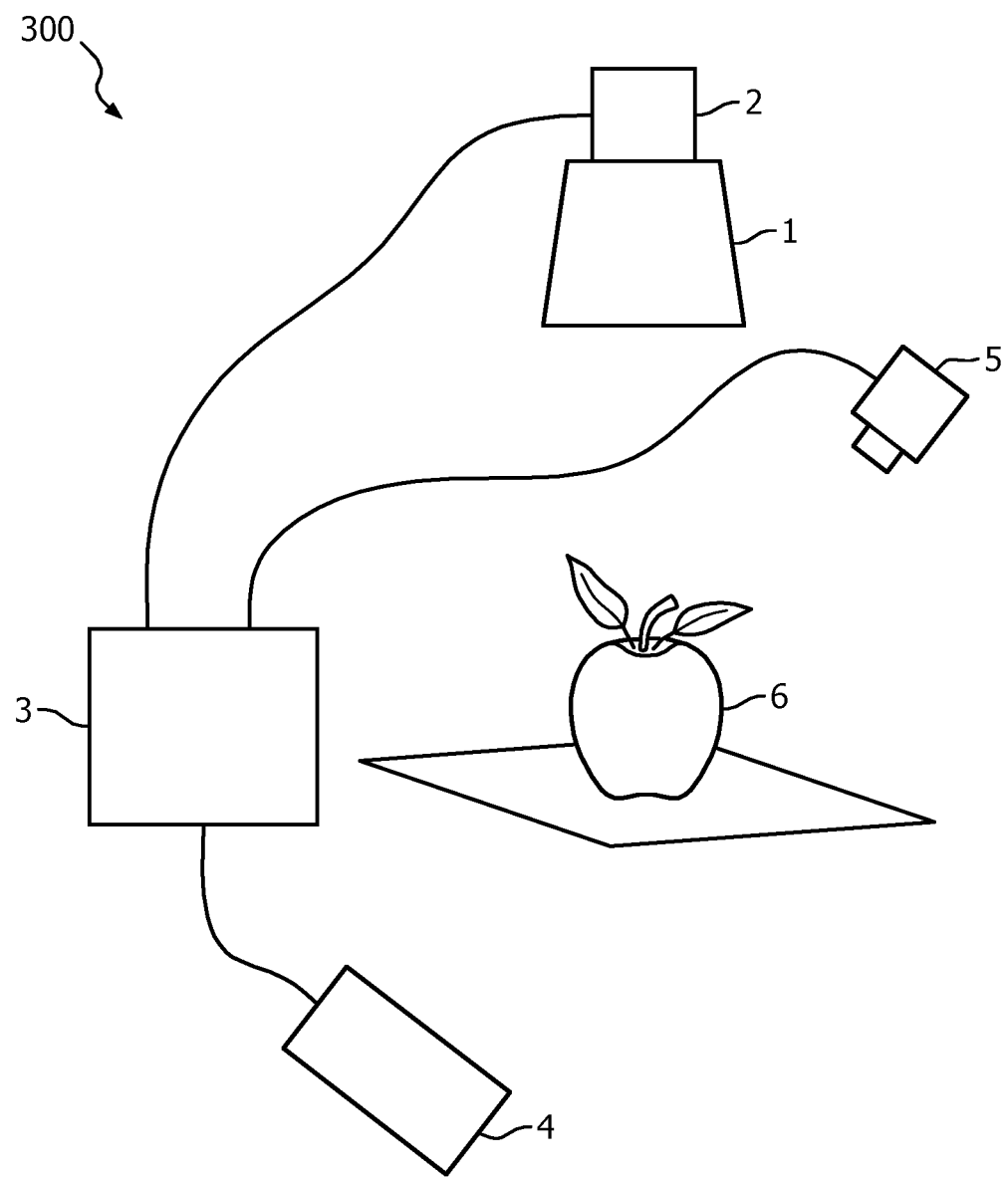
FIG. 3 schematically shows another embodiment of a lighting system.

FIG. 3 schematically shows another embodiment of a lighting system 300. The embodiment of the lighting system 300 is similar to the embodiments of the lighting systems 100 and 200 that are discussed previously and has similar effects as previously discussed embodiments. In FIG. 3 are presented: a lighting arrangement which comprises a driving circuitry 2 and a light source 1 which comprises, in line with previous embodiments, different light emitters which emit at least two different color distributions, a controller 3, a sensor 5 and a user-interaction device 4. The lighting system 300 is used to illuminate object 6. The lighting arrangement emits mixed light toward the object 6 which at least partially reflects the received light. The sensor is arranged at a relative position with respect to the lighting arrangement and is arranged in such a direction that it measures an amount of light that is reflected by the object 6 and the area on which the object 6 is arranged. A user of the lighting system 300 is able to provide to the user-interaction device 4 (which comprises at least a user interface) lighting conditions. The user provides input which defines requirements for the light that is received by the sensor 5. The controller controls the lighting arrangement such that these lighting conditions are met and such that the power consumption of the lighting arrangement is minimized. The lighting system 300 is, for example, installed in the vegetable department of a supermarket. The lighting arrangement of the lighting system 300 illuminates apples 6. The user requires a minimum illumination level, requires a minimum color rendering index such that all colors of the apples 6 and its environment are well rendered by the human naked eye when being illuminated by the lighting arrangement. The lighting system of the patent application that is cited in the prior art may add in such cases, for example, some additional saturated green light to the emitted light such that the apples appear more green to buyers. Such a condition of additional green light may also be provided via the user interaction device to the controller. The sensor 5 is at least temporarily placed at a position where eyes of customers of the supermarket are when they look towards the apples from the aisle. Than the lighting system 300 performs a calibration procedure to measure how the different emitted color distributions are reflected towards the position of the sensor such that the controller the lighting system 300 is able calculate the efficiency ratios. These efficiency ratios and the input of the user received via the user-interaction device 4 is used to calculate a specific lighting setting for the lighting arrangement, which means that the controller 3 provides a control signal to the driving circuitry 2 in which it informs the driving circuitry 2 of required light emissions by different groups of light emitters of the light source 1. If this lighting system 300 is used and if during the installation of the lighting arrangement such a calibration procedure is executed, the products are well illuminated while the amount of required energy is well kept within boundaries.

Figure 4:
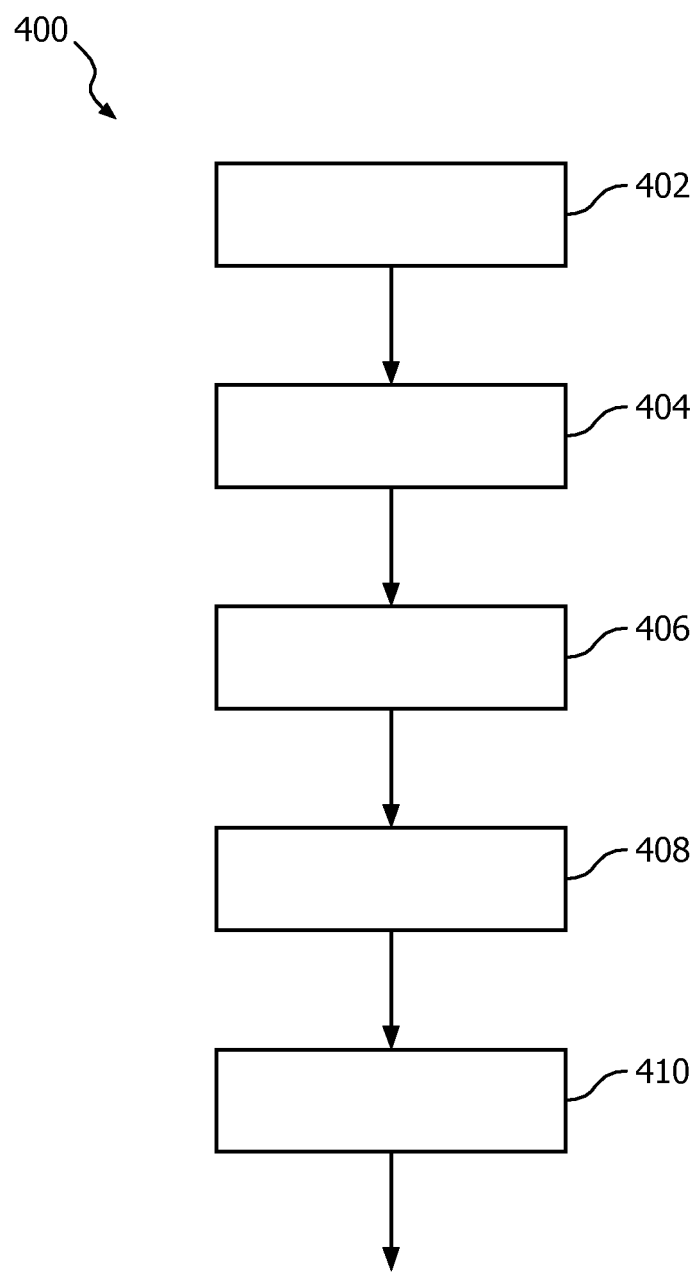
FIG. 4 schematically shows a method of controlling a lighting system.

FIG. 4 schematically shows a method 400 of controlling a lighting system. The lighting system is one of the above discussed embodiments of the lighting system. The method comprises the stages of: i) obtaining 402 a required illumination level, ii) obtaining 404 a first efficiency ratio and a second efficiency ratio, the first efficiency ratio is a ratio between an amount of power provided to the first light emitter and an amount of the first light received at a relative position with respect to the lighting arrangement, the second efficiency ratio is a ratio between an amount of power provided to the second light emitter and an amount of the second light received at the relative position, iii) generating 406 a control signal, the control signal comprising a first required light emission by the first light emitter and a second required light emission by the second light emitter, the control signal is generated by determining the first required light emission and the second required light emission such that, when said light emitters emit light according to said required light emissions, an amount of the mixed light received at the relative position is at least the required illumination level while an amount of power consumed by the lighting arrangement is minimized, iv) providing 408 the control signal to the driving circuitry, v) driving 410 the first light emitter at a first power level in response to the received control signal and driving the second light emitter at a second power level in response to the received control signal. As discussed in the context of FIGS. 1 to 3, the method may also comprise a calibration stage for obtaining the efficiency ratios. The calibration stage comprises for each light emitter (or for each group of light emitters) different stages of a) controlling one light emitter (or a group of light emitters) to emit light when they receive a predetermined amount of power, b) measuring an amount of received light at the relative position and c) calculating one of the efficiency ratios.

In summary, the application provides a lighting system and a method of controlling a lighting system. The lighting system comprises a lighting arrangement with a first light emitter and a second light emitter, a driving circuitry and a controller providing a control signal to the driving circuitry. The first and second light emitters emit different colors or light. The controller is configured to generate the control signal such that a required minimum amount of light is received at a relative position with respect to the lighting arrangement and that the amount of power used by the lighting arrangement is minimized when the lighting arrangement emits light in accordance with the generated control signal. In the generation of the control signal efficiency ratios for the different light emitters are taken in to account.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A lighting system comprising a controller for generating a control signal and comprising a lighting arrangement, the lighting arrangement being configured to emit mixed light being a combination of first light ($L_1$) and second light ($L_2$), the lighting arrangement comprising a first light emitter, a second light emitter and a driving circuitry, the lighting arrangement being configured to receive a control signal from the controller, wherein the control signal indicating a first required light emission by the first light emitter and a second required light emission by the second light emitter, the first light emitter being configured to emit the first light ($L_1$) of a first color distribution and the second light emitter being configured to emit the second light ($L_2$) of a second color distribution being different from the first color distribution, the driving circuitry being configured to drive the first light emitter at a first power level ($P_1$) in response to the received control signal and to drive the second light emitter at a second power level ($P_2$) in response to the received control signal, the controller being configured to obtain a required illumination level ($I_{min}$), a first efficiency ratio ($R_1$) and a second efficiency ratio ($R_2$), the first efficiency ratio ($R_1$) being a ratio between an amount of power ($P_1$) provided to the first light emitter and an amount of the first light ($L_1$) received at a relative position (P) with respect to the lighting arrangement, the second efficiency ratio ($R_2$) being a ratio between an amount of power ($P_2$) provided to the second light emitter and an amount of the second light ($L_2$) received at the relative position (P), determine the first required light emission and the second required light emission to obtain, when the said light emitters emit light in accordance with said required light emissions, an amount (I) of the mixed light received at the relative position (P) being at least the required illumination level ($I_{min}$) while an amount of power consumed by the lighting arrangement is minimized.

2. A lighting system according to claim 1 further comprising a sensor for sensing an amount (I) of light impinging on the sensor and for being positioned at the relative position (P), the sensor being coupled to the controller.

3. A lighting system according to claim 2, wherein the controller is further configured to determine the first efficiency ratio and the second efficiency ratio by:

providing a first control signal to the lighting arrangement indicating that only the first light emitter has to be driven with a specific amount of power, obtaining a measurement from a sensor arranged at the relative position (P) while only the first light emitter emits first light ($L_1$) in accordance with the first control signal, calculating the first efficiency ratio ($R_1$), providing a second control signal to the lighting arrangement indicating that only the second light emitter has to be driven with a specific amount of power, obtaining a measurement from the sensor while only the second light emitter emits second light in accordance with the second control signal, calculating the second efficiency ratio ($R_2$).

4. A lighting system according to claim 3, wherein the controller is configured to determine the first efficiency ratio and the second efficiency ratio at least at one of the moments of: when the lighting system is installed, when the lighting system is switched on and when a calibration command is received.

5. A lighting system according to claim 2, wherein the sensor is adapted to measure reflected light for obtaining an amount light reflected into the direction of the relative position (P) from an area illuminated by the lighting arrangement.

6. A lighting system according to claim 2, wherein:

the first efficiency ratio ($R_1$) is a ratio between an amount of power ($P_1$) provided to the first light emitter and an amount of the first light ($L_1$) reflected into the direction of the relative position (P) from an area illuminated by the lighting arrangement;

the second efficiency ratio ($R_2$) being a ratio between an amount of power ($P_2$) provided to the second light emitter and an amount of the second light ($L_2$) reflected into the direction of the relative position (P) from the area illuminated by the lighting arrangement;

the sensor is adapted to measure reflected light for obtaining an amount light reflected into the direction of the relative position (P) from the area illuminated by the lighting arrangement.

7. A lighting system according to claim 1 further comprising a user interface arrangement being coupled to the controller and being configured to receive from a user the required illumination level ($I_{min}$).

8. A lighting system according to claim 1 wherein the controller is further configured to:

obtain an additional requirement with respect to characteristics of the mixed light received at the relative position (P), take into account the additional requirement, the required illumination level ($I_{min}$) and the objective of the minimum power consumption by the lighting arrangement while determining the first required light emission and the second required light emission.

9. A lighting system according to claim 8, wherein the additional requirement is at least one of: a minimum Color Rending Index of the light received at the relative position (P), a color point of the light received at the relative position (P), a color temperature of the light received at the relative position (P) and a required additional saturated color component in the emitted mixed light.

10. A lighting system according to claim 1, wherein the required illumination level ($I_{min}$) and amounts of the light received at a relative position (P) are an amount of light expressed in lumen.

11. A lighting system according to claim 1, wherein the lighting arrangement comprises in addition to the first light emitter and second light emitter one or more additional light emitters, the additional light emitters emit light of different color distributions, the control signal also indicates required light emissions by the additional light emitters, the driving circuitry is configured also to drive the additional light emitters at specific power levels in response to the received control signal, the controller is configured to obtain for the additional light emitters additional efficiency ratios, the additional efficiency ratios are ratios between an amount of power providing to a respective one of the additional light emitters and an amount of light emitted by the respective one of the additional light emitters as received at the relative position, the controller is also configured to determine the first required light emission, the second required light emission and the additional required light emissions to obtain the amount of the mixed light received at the relative position (P) that is at least the required illumination level ($I_{min}$) while the amount of power consumed by the lighting arrangement receiving the control signal is minimized.

12. A lighting system according to claim 11, wherein the lighting arrangement comprises groups of light emitters, within each group of light emitters the light emitters are configured to emit the same color of light, each group of light emitters is configured to emit a different color distribution, said required light emissions of the control signal each indicate a required light emission by a specific group of light emitters, the driving circuitry is configured to drive the groups of light emitters in response to the received control signal, said efficiency ratios are each a ratio between an amount of power provided to the light emitters of a specific group and an amount (I) of light emitted by the light emitter of the specific group received as at the relative position (P).

13. A lighting system according to claim 1, wherein the controller and the lighting arrangement are provided in separate devices.

14. A lighting system according to claim 13, wherein the controller and the lighting arrangement are configured to communicate with each other via a network and the controller is configured to provide the control to the lighting arrangement via the network and the lighting arrangement is configured to receive the control signal via the network.

15. A lighting system according to claim 14, wherein the controller is configured to receive data obtained by the sensor and the user interface arrangement via the network.

16. A method of controlling a lighting system, the lighting system comprises a lighting arrangement for emitting mixed light, the lighting arrangement comprises a first light emitter, a second light emitter and a driving circuitry, the first light emitter is configured to emit first light of a first color distribution and the second light emitter is configured to emit second light of a second color distribution, the first color distribution being different from the second color distribution, the method comprises the stage of:
obtaining a required illumination level,
obtaining a first efficiency ratio and a second efficiency ratio, the first efficiency ratio is a ratio between an amount of power provided to the first light emitter and an amount of the first light received at a relative position with respect to the lighting arrangement, the second efficiency ratio is a ratio between an amount of power provided to the second light emitter and an amount of the second light received at the relative position,
generating a control signal, the control signal comprising a first required light emission by the first light emitter and a second required light emission by the second light emitter, the control signal is generated by determining the first required light emission and the second required light emission such that, when said light emitters emit light according to said required light emissions, an amount of the mixed light received at the relative position is at least the required illumination level while an amount of power consumed by the lighting arrangement is minimized,
providing the control signal to the driving circuitry,
driving the first light emitter at a first power level in response to the received control signal and driving the second light emitter at a second power level in response to the received control signal.

* * * * *